US010424837B2

(12) United States Patent
Mejia

(10) Patent No.: US 10,424,837 B2
(45) Date of Patent: *Sep. 24, 2019

(54) HIGH TEMPERATURE TRANSPONDERS

(71) Applicant: JAMM TECHNOLOGIES, INC., La Garita, Alajuela (CR)

(72) Inventor: Ezequiel Mejia, Woodbury, MN (US)

(73) Assignee: Jamm Technologies, Inc., Alajuela (CR)

( * ) Notice: Subject to any disclaimer, the term of this patent is extended or adjusted under 35 U.S.C. 154(b) by 189 days.

This patent is subject to a terminal disclaimer.

(21) Appl. No.: 15/587,828

(22) Filed: May 5, 2017

(65) Prior Publication Data

US 2017/0256850 A1 Sep. 7, 2017

Related U.S. Application Data

(63) Continuation of application No. 14/027,896, filed on Sep. 16, 2013, now Pat. No. 9,673,516.

(60) Provisional application No. 61/701,260, filed on Sep. 14, 2012.

(51) Int. Cl.
| | |
|---|---|
| *H04B 1/59* | (2006.01) |
| *H01Q 1/40* | (2006.01) |
| *H01Q 1/00* | (2006.01) |
| *H01Q 1/22* | (2006.01) |
| *H01Q 7/06* | (2006.01) |
| *G06K 7/10* | (2006.01) |

(52) U.S. Cl.
CPC ............ *H01Q 1/40* (2013.01); *G06K 7/10336* (2013.01); *H01Q 1/002* (2013.01); *H01Q 1/22* (2013.01); *H01Q 7/06* (2013.01)

(58) Field of Classification Search
CPC ............ H01Q 1/40; H01Q 1/002; H01Q 1/22; H01Q 7/06; G06K 7/10336
See application file for complete search history.

(56) References Cited

U.S. PATENT DOCUMENTS

| | | |
|---|---|---|
| 5,211,129 A | 5/1993 | Taylor |
| 5,482,008 A | 6/1996 | Stafford et al. |
| 5,833,603 A | 11/1998 | Kovacs et al. |
| 5,977,431 A | 11/1999 | Knapp et al. |
| 6,329,958 B1 | 12/2001 | McLean |
| 6,546,982 B1 | 4/2003 | Brown et al. |
| 7,508,350 B2 | 3/2009 | Hein |
| 2001/0004236 A1 | 6/2001 | Letkomiller et al. |

(Continued)

FOREIGN PATENT DOCUMENTS

| | | |
|---|---|---|
| JP | 2010-018482 A | 1/2010 |
| WO | WO 2012/062965 A1 | 5/2012 |

OTHER PUBLICATIONS

European Search Report for corresponding European Application No. 13836381.7, dated Apr. 26, 2016 (2 pages).

(Continued)

*Primary Examiner* — Dameon E Levi
*Assistant Examiner* — David E Lotter
(74) *Attorney, Agent, or Firm* — Bookoff McAndrews, PLLC

(57) ABSTRACT

The present invention provides, in alternative embodiments, high temperature transponders that can withstand high temperature shocks and can maintain their physical and electrical characteristics following high temperature exposure, and methods of making said transponders.

20 Claims, 3 Drawing Sheets

(56) References Cited

U.S. PATENT DOCUMENTS

| | | | |
|---|---|---|---|
| 2002/0154065 A1* | 10/2002 | Mejia | G06K 19/07749 |
| | | | 343/788 |
| 2004/0159383 A1* | 8/2004 | Adamson | B60C 11/00 |
| | | | 152/152.1 |
| 2005/0001785 A1* | 1/2005 | Ferguson | G06K 19/07745 |
| | | | 343/895 |
| 2006/0044110 A1* | 3/2006 | Napolitano | G06K 17/0022 |
| | | | 340/5.92 |
| 2006/0266435 A1 | 11/2006 | Yang et al. | |
| 2007/0008235 A1* | 1/2007 | Tsukahara | B60R 25/246 |
| | | | 343/788 |
| 2007/0010702 A1* | 1/2007 | Wang | A61F 2/82 |
| | | | 600/8 |
| 2007/0040643 A1* | 2/2007 | Inoue | H01F 17/045 |
| | | | 336/213 |
| 2007/0120758 A1* | 5/2007 | Takahashi | G04G 21/04 |
| | | | 343/788 |
| 2009/0270985 A1 | 10/2009 | Schuessler | |
| 2009/0315681 A1 | 12/2009 | Blair | |
| 2011/0226856 A1 | 9/2011 | Meilland et al. | |
| 2011/0259965 A1 | 10/2011 | Mejia | |
| 2011/0297306 A1 | 12/2011 | Yang | |
| 2013/0131800 A1 | 5/2013 | Schuessler | |

OTHER PUBLICATIONS

International Search Report and the Written Opinion of the International Searching Authority dated Dec. 5, 2013 in International Application No. PCT/US2013/059988.

International Search Report and the Written Opinion of the International Searching Authority dated Jan. 10, 2014 in the International Application No. PCT/US2013/059964.

* cited by examiner

HIGH TEMPERATURE TRANSPONDERS

RELATED APPLICATIONS

This application is a continuation of U.S. application Ser. No. 14/027,896, filed Sep. 16, 2013, which claims the benefit of, and priority to, U.S. Provisional Application No. 61/701,260, filed Sep. 14, 2012, entitled "High Temperature Transponders," all of which are incorporated herein by reference in their entireties.

BACKGROUND

Transponders exist in the market which may be used for various animal applications (e.g., for tracking/individual identification of companion animals, fish, slaughter animals, etc.). These transponders include passive RFID (radio frequency identification) transponders, which may be encapsulated in glass or other similarly durable material, and can be implanted directly in the animal (e.g., using a syringe). Such transponders are described, for example, in U.S. Pat. No. 5,211,129, which is incorporated herein by reference in its entirety.

Applicant has determined that transponders may also be used advantageously in implantable devices. Preferably, the transponder is incorporated into the device during its manufacture, and the device with transponder integrated therein is subsequently implanted into an animal or human.

However, the manufacture of implantable devices typically involves high temperatures, for example, about 150 to 210° C. (±20° C.). Existing transponders are not configured to withstand such conditions.

Heretofore, implantable transponders have needed only to operate at the body temperature of the animal in which they are implanted, and to withstand typical shipping/storage conditions. For example, existing transponders typically use microchips that are rated only to 80° C. for operation and to 125° C. for storage. In addition, existing transponders often use an anisotropic connection to connect the antenna leads to the microchip; this connection is made with glues that may fail at high temperatures. Testing has shown that existing transponders show an unacceptable rate of failure following high temperature exposure.

Thus, there is a need in the art for transponders that can withstand high temperature environments such as those used in manufacturing, without comprising the ability to store and retrieve data therefrom when used afterwards under normal operating conditions.

SUMMARY

The present invention provides, in various embodiments, transponders that can maintain their physical and electrical characteristics following high temperature exposure, and methods of making said transponders.

In some embodiments, the invention provides a high temperature transponder comprising an antenna assembly, comprising a ferrite core, an antenna wire wound around the ferrite core in a coil, and an integrated circuit chip with two metal inlay portions to which each end of the antenna wire is connected by a thermal compression, laser welding, soldering, or crimp connection; a glass capsule enclosing the antenna assembly; and a glue for positioning and securing the antenna assembly within the glass capsule.

In some embodiments, the high temperature transponder is configured to withstand 4 to 8 hour cycles of temperatures of 165 to 195° C. In some embodiments, the ferrite core comprises a Ni—Zn ferrite. In some embodiments, the antenna wire comprises an insulated copper wire.

In some embodiments, the integrated circuit chip comprises a complementary metal-oxide-semiconductor (CMOS) integrated circuit storing an identification code. In some embodiments, the metal inlay comprises gold. In some embodiments, the antenna wire is connected to the integrated circuit chip by thermal compression.

In some embodiments, the glue is a light-curing acrylate adhesive. In some embodiments, the glue covers at least 50 to 75% of the antenna assembly.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the device of the present application, there are shown in the drawings preferred embodiments. It should be understood, however, that the application is not limited to the precise arrangements and instrumentalities shown. In the drawings.

DETAILED DESCRIPTION

The present invention provides, in various embodiments, high temperature transponders that can withstand high temperature shocks and can maintain their physical and electrical characteristics following high temperature exposure, and methods of making said transponders.

In preferred embodiments, the invention provides high temperature transponders that can withstand temperatures of about 150 to 210° C. (±20° C.), preferably about 165 to 195° C. (±15° C.), for a predetermined period of time (e.g., about 4 to 48 hours). For example, a high temperature transponder according to the present invention can withstand 4 to 8 hour cycles of temperatures between 165 and 195° C. (±15° C.).

Preferably, all the components of the high temperature transponder (e.g., the antenna wires, the ferrites, the potting glue, and the microchip) are stable during and after exposure to said temperatures.

Figure 1A:
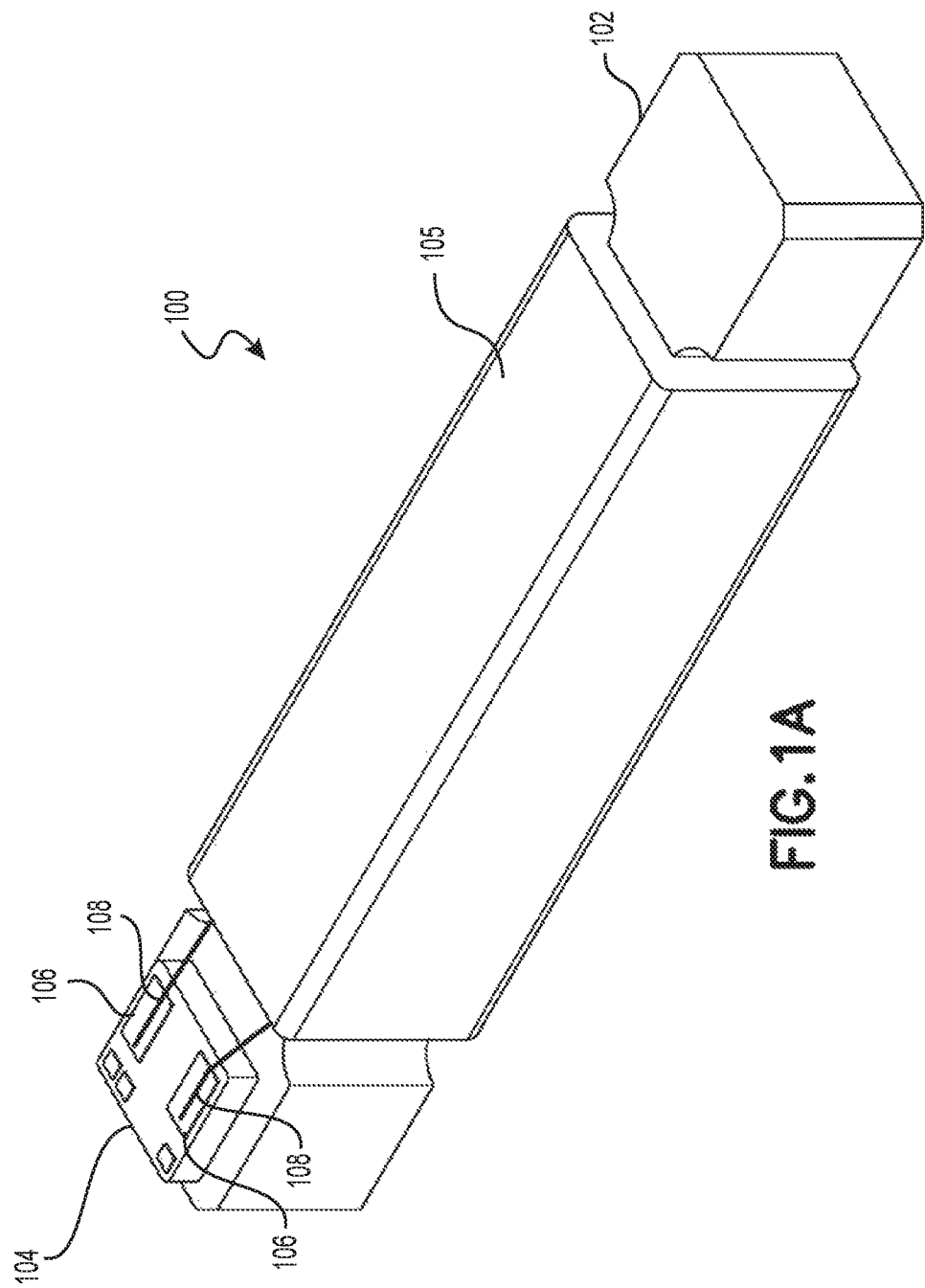
FIG. 1A shows an exemplary isometric view of an antenna assembly for a high temperature transponder of the present invention, according to some embodiments.
Figure 1B:
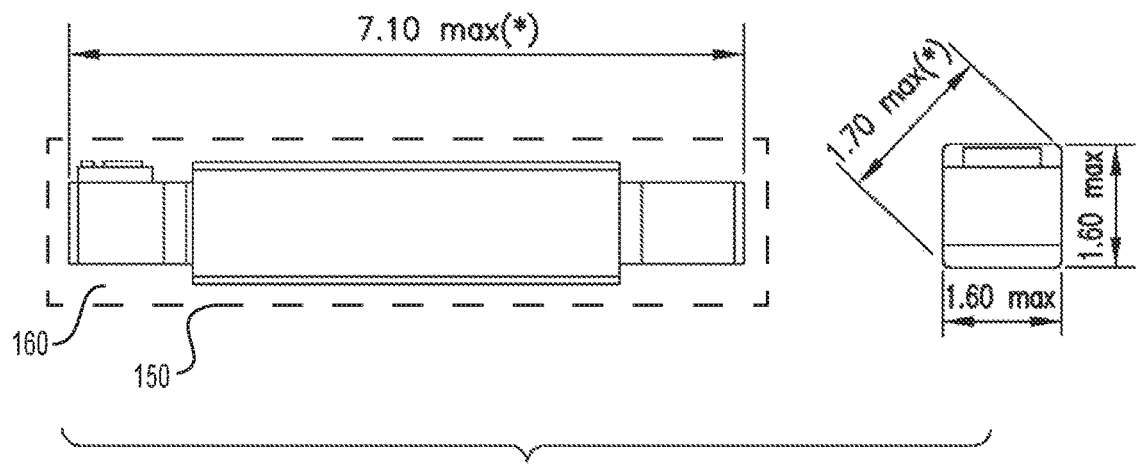
FIG. 1B shows side and end views of the antenna assembly of FIG. 1A, with exemplary dimensions given in mm.

FIG. 1A shows an exemplary isometric view of an antenna assembly 100 for a high temperature transponder of the present invention, according to some embodiments. FIG. 1B shows side and end views of the antenna assembly 100 of FIG. 1A, with exemplary dimensions given in mm.

In an exemplary embodiment, the antenna assembly 100 shown in FIGS. 1A and 1B may comprise, for example, a Ni—Zn ferrite core 102 (NZ511A, Kyocera), copper wire with modified polyurethane Polysol 180 (P180, 0.030 mm, Elektrisola Inc.) wound around the ferrite core 102 in a coil 105 (individual wound wire strands not pictured), and an EM4305 RFID chip 104 (EM Microelectronic) attached to the ferrite core 102 with an adhesive (DELOMONOPDX® AD066), the microchip including gold pads 106 to which each end 108 of the wire is connected directly by thermal compression. In alternative embodiments, high temperature transponders of the present invention may be formed with different shapes, dimensions, materials, and/or connections as described below, as long as they can withstand high temperatures without losing their physical and electrical characteristics at normal operating temperatures.

In some embodiments, the high temperature transponders of the present invention include antennas comprising ferrites that can withstand temperatures up to about 250° C. without losing their magnetic characteristics when utilized subsequently at lower temperatures (e.g., less than 100° C.). In some cases, the material for ferrites may withstand high temperatures with some change, but its magnetic characteristics can recover at lower temperatures for normal operation. In some embodiments, the ferrites comprise nickel and zinc (Ni—Zn). One example of a suitable ferrite core material is NZ511A (Kyocera), which is a Ni—Zn ferrite with an initial permeability $\mu_i$ of 2000 at 100 kHz, a Curie temperature Tc of 80° C., and electrical resistivity of 100M Ωcm. Other Ni—Zn ferrite materials may be used in alternative embodiments.

Figure 2:
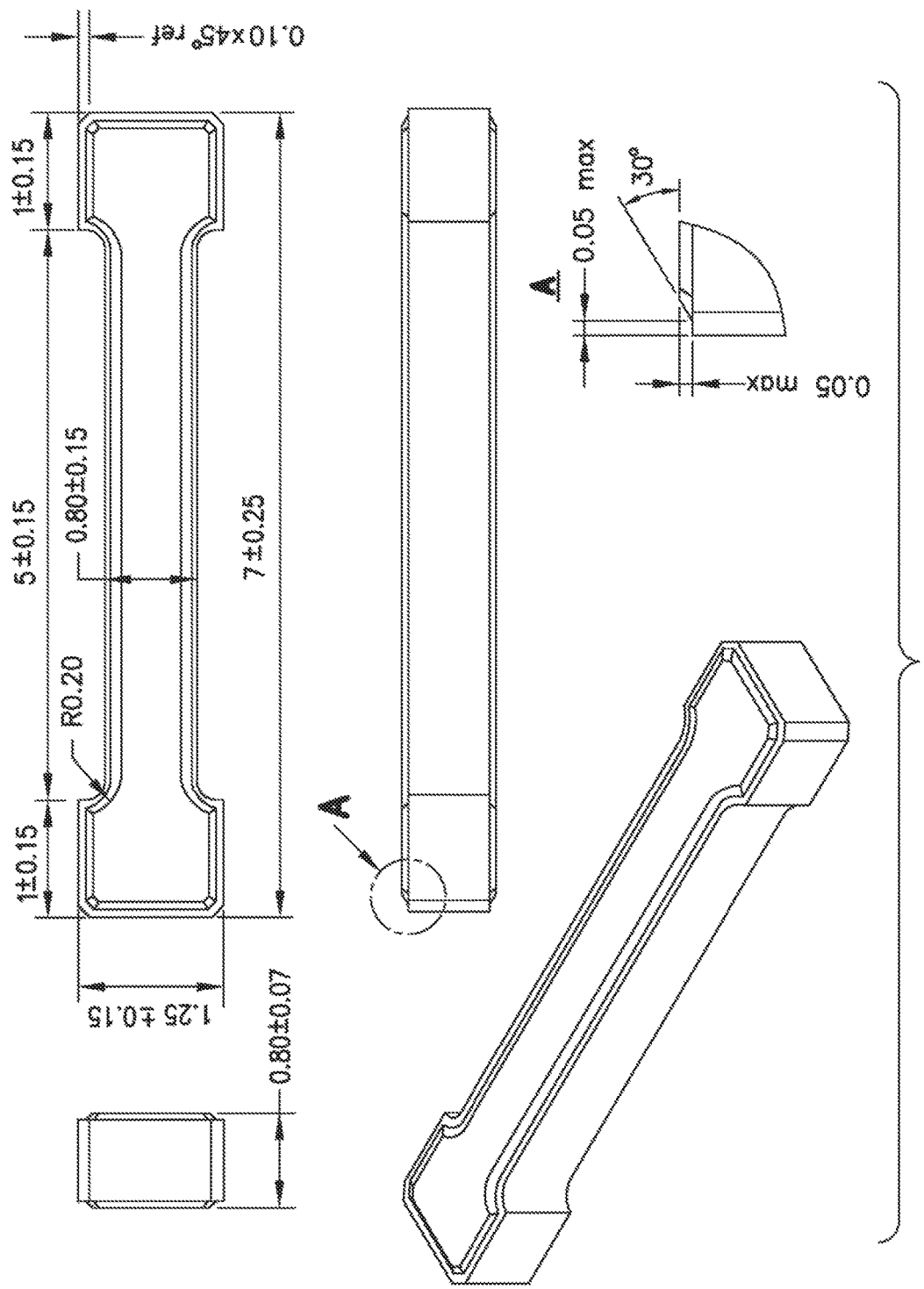
FIG. 2 shows various views of a ferrite core according to some embodiments of the invention, with exemplary dimensions given in mm.

FIG. 2 shows various views of a ferrite core according to some embodiments of the invention, with exemplary dimensions given in mm. The ferrite core in FIG. 2 has a bone shape, about 7.0 mm in total length, with a narrow center portion about 5.0 mm long and about 0.80 mm wide, and two wider end portions each about 1.0 mm long and about 1.25 mm wide. The ferrites can have different shapes and/or dimensions (e.g., for different applications). In one or more alternative embodiments, the ferrites may have, for example, a tubular shape, about 1.0 mm in diameter and about 15 mm long. In some embodiments, the width/diameter of the ferrite core may range, for example, from about 0.5 mm to about 5 mm. In some embodiments, the width/diameter is about 0.5 to 1.2 mm. In other embodiments the width/diameter is about 1.0 to 4.0 mm. In some embodiments, the length of the ferrite core may range, for example, from about 5.0 mm to about 20 mm. In preferred embodiments, the length is about 6 to 15 mm.

In some embodiments of the invention, the high temperature transponders include a high temperature microchip or die, the electronic ASIC (application specific integrated circuit). In certain preferred embodiments, the high temperature transponders include high temperature microchips that can withstand temperatures of about 250° C. In some embodiments, the high temperature transponders include high temperature microchips that can withstand predetermined stress tests (e.g., reliable operation after 1000 hours at 150° C. and/or 12 hours at 250° C.). The chip module can use, for example, an EM4305 identification device (EM Microelectronic, Switzerland), which is a CMOS (complementary metal-oxide-semiconductor) integrated circuit. Other types of microchips that meet the above-described temperature criteria may be used in alternative embodiments.

In some embodiments, the microchip includes a conductive portion (e.g., metal pads inlaid on the top of the chip) for connecting the die to the antenna wires. In some embodiments, the chip is, for example, chemically etched and a metal pad is embedded (micro-molded) in the etched portion of the chip. The inlaid pads may comprise gold, silver, or another metal, or an alloy (mix of two or more different metals) or other conductive material. In some embodiments, the pads are about 200×400 μm. In other embodiments different size conductive pads may be used; the dimensions of the pads are preferably selected based on the diameter of the antenna wire. In preferred embodiments, there are two pads, connecting to each of the two ends of the antenna wire. In other embodiments there may be different numbers of pads/connections.

In some embodiments, the microchip may be secured to the ferrite antenna, for example, with an adhesive (e.g., DELOMONOPDX® AD066, which is a heat-curing epoxy adhesive). In other embodiments, the microchip is not directly attached to the ferrite antenna, but they are linked via the antenna wire wound around the ferrite antenna, which is connected to the microchip as described below.

Figure 3:
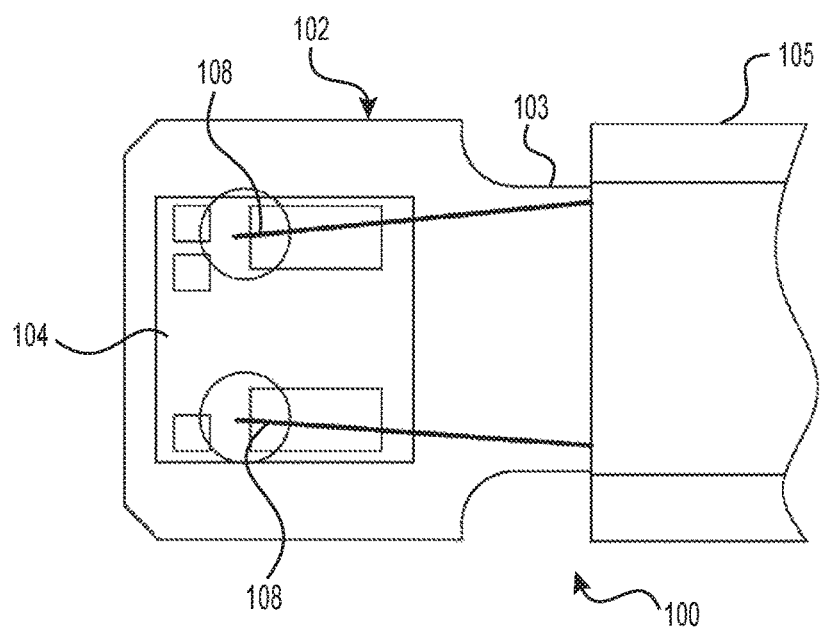
FIG. 3 shows an expanded top view of the antenna assembly of FIG. 1A, according to some embodiments of the invention.

In some embodiments of the invention, the high temperature transponders include antenna wires that can withstand temperatures of about 190 to 250° C. (±20° C.). In certain preferred embodiments, the high temperature transponders include antenna wires that can withstand temperatures of about 212° C. for up to 10,000 hours. Preferably, the antenna wires can withstand temperatures at least 20° C. above the temperature that the transponder is subjected to. Examples of suitable antenna wires include, but are not limited to, insulated copper wires such as Elektrisola Enameled Copper Wires (e.g., P180 wire with Polysol 180, A200 wire with Amidester 200, etc.) with diameters from 0.010 to 0.50 mm, preferably about 0.030 mm. In some embodiments, the antenna wire is wound uniformly around the narrow portion 103 of the ferrite core 102 (e.g., 800-1000 turns) in a coil 105, and the each end is secured to the RFID chip 104, as shown in FIG. 3.

In certain preferred embodiments of the invention, the high temperature transponders are manufactured such that the antenna wire ends 108 are connected directly to the microchip/die/module 104 (without use of a printed circuit board, which could deform/melt/shrink at high temperatures and lose connection with the die), which provides long term reliability as well as resistance to heat changes. For example, in some embodiments, thermal compression may be used to press the antenna wire ends into gold pads (e.g., 12 to 15 μm thick) on the microchip using diamond points, carefully controlling pressure, time, and temperature (which may be ≥300° C.), such that the wire coating/insulation burns off and the wire melds into the gold to create an adhesive-free contact. In alternative embodiments, other connection methods (e.g., laser welding, crimp connections, soldering, or high temperature adhesive) may be used as long as they meet the high temperature requirements. High temperature-stable antenna connections provide greater reliability in the resulting transponder.

In some embodiments of the invention, the high temperature transponders are glass encapsulated (see, for example, glass capsule 150 shown schematically by dashed line in the side view portion of FIG. 1B). Suitable glass vials may be formed, for example, from 8350 AR-Glas® (Schott AG, Germany), which is a soda-lime silicate glass. In some embodiments, the vials are cylindrical, having a length and diameter selected to accommodate the dimensions of the ferrite antenna (e.g., about 9.5 mm in length and 2.0 mm in diameter, to accommodate an antenna such as that shown in FIGS. 1A and 1B). Various vial shapes and dimensions can be used depending on the application.

In some embodiments of the invention, the high temperature transponders include a high temperature glue to hold the antenna assembly firmly inside the glass (e.g., to avoid shock damage). For example, in some embodiments, the glass vial (e.g., area 160 in glass capsule 150 depicted in the side view portion of FIG. 1B) is filled (partially or fully) with glue, the antenna assembly is placed into the glass vial, and the glue is cured. The high temperature glue or epoxy potting material preferably not only withstands high temperatures (e.g., does not evaporate or expand), but also does not become brittle/hardened after heating and cooling (which can affect the shock resistance of the transponder and/or break the electronics). In certain preferred embodiments, the high temperature glue can withstand temperatures of about 200 to 250° C. (±20° C.) without significant change in viscosity, and can maintain its normal/characteristic state upon return to lower temperatures (e.g., about 24° C.). Preferably, the high temperature glue can withstand temperatures at least 20° C. above the highest temperature that the transponder is subjected to. One example of a suitable high temperature glue is DELO-PHOTOBOND® 4442 (DELO Industrial Adhesives, Germany), which is a photoinitiated-curing acrylate adhesive. Other types of glues that meet the above-described criteria may be used in alternative embodiments.

In some embodiments, before placement in the vial, a frequency test may be performed to verify that the frequency of the ferrite lots is within predetermined minimum and maximum limits. The sample size may vary (e.g., 32 pieces per lot). An exemplary working frequency is 134 kHz. Other frequencies may be employed in alternative embodiments.

In certain preferred embodiments, the high temperature transponders can withstand shock, for example a shock equivalent to a drop from one meter onto a hard surface such as concrete. In some embodiments, for high shock resistance, the high temperature transponders are manufactured with a high percentage of glue filling the glass vials. The glue should cover over 50% of the antenna wire coil, and preferably covers at least about 50 to 75% of the coil. In some embodiments, the vial can be filled to the top with glue.

In some embodiments, the glass vial is filled with a predetermined amount of high temperature glue and then the antenna assembly is added (preferably with the chip end first). Additional glue may be added if needed to cover the desired portion of the antenna assembly, and the glue is cured. The glass vials can then be sealed, for example, by a laser or a hydrogen micro-flame. In some embodiments, a seal is formed by rotating the glass in a flame for about 800 ms, so that about 0.5 mm at the end of the vial forms a bubble/dome. Other sealing methods (caps, etc.) are contemplated and may be used as long as the materials meet the above-described temperature criteria.

Preferably, the high temperature transponders are configured (materials, shape, winding characteristic, etc.) to provide high sensitivity at lower magnetic fields. One exemplary reading range is about 25 cm using a Destron Fearing™ FS2001F reader. In certain preferred embodiments, a transponder having a length of about 9 mm has a reading range of about 15 cm in the worst orientation.

In some embodiments, any specialized machinery can be used to manufacture the high temperature transponders, provided it uses materials having the specified characteristics, and includes a high temperature-stable connection between the antenna and the microchip.

In preferred embodiments, methods of manufacturing the high temperature transponders include reliability testing (operation of the transponder after exposure to high temperature for a specified time, e.g., 12 hours at 180° C., and then cooling to room temperature). Following reliability testing, the high temperature transponders also preferably undergo pressure testing for leakage (e.g., in a vacuum at a specified pressure for a given length of time), visual inspection for physical damage (e.g., to visually verify glass integrity and/or seal integrity, and to remove any transponders showing glass damage or liquid in the vial), and/or full range testing to meet predetermined specifications (e.g., record ID for each tag electronically, verify reading distance, verify unique IDs, etc.).

In some embodiments, functional performance is evaluated following 24 hours of temperature cycling as follows: hold steady at +70° C. for 30 minutes; decrease temperature from +70° C. to −15° C. in one hour; hold steady at −15° C. for 30 minutes; increase temperature from −15° C. to +70° C.; end of cycle, continue process for 24 hours.

The high temperature transponders of the present invention may be of any size and shape appropriate for the desired application.

In some embodiments of the invention, the high temperature transponders may be supplied as part of kit, including, but not limited to, one or more interrogation devices or readers, which can power the transponder by inductive coupling, and can receive the identification signal transmitted by the transponder antenna.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

The invention claimed is:

1. A transponder, comprising:
   an antenna assembly, comprising:
      a core having a length ranging from 5 mm to 20 mm;
      an insulated wire disposed around the core in a coil, the insulated wire having a first end and a second end; and
      an integrated circuit chip, wherein the first end and the second end of the insulated wire are each connected to the integrated circuit chip;
   a capsule enclosing the antenna assembly and defining a space between the capsule and the antenna assembly; and
   a high temperature adhesive disposed within the space and covering at least 50% of the insulated wire, wherein the adhesive is cured and fixes a position of the antenna assembly relative to the capsule.

2. The transponder of claim 1, wherein the antenna assembly and the high temperature adhesive of the transponder are together configured to withstand temperatures ranging from 165° C. to 195° C. without losing functionality of the transponder.

3. The transponder of claim 2, wherein the transponder has a working frequency of 134 kHz.

4. The transponder of claim 1, wherein the insulated wire comprises copper and is wound uniformly around the core from 800 to 1000 times.

5. The transponder of claim 1, wherein the chip includes two metal inlay portions embedded within the chip, and wherein the first end and the second end of the insulated wire are each connected to a respective one of the two metal inlay portions by at least one of thermal compression, laser welding, crimp connection, soldering, or a connection adhesive.

6. The transponder of claim 5, wherein the metal inlay portions comprise gold.

7. The transponder of claim 1, wherein the chip comprises a complementary metal-oxide-semiconductor (CMOS) integrated circuit storing an identification code.

8. The transponder of claim 1, wherein the transponder is configured for inclusion in a medical implant and to withstand temperatures ranging from 150° C. to 210° C. during manufacture of the implant.

9. The transponder of claim 1, wherein the high temperature adhesive covers at least 75% of the insulated wire.

10. The transponder of claim 1, wherein at least a portion of the core has a width ranging from 0.5 mm to 5 mm.

11. The transponder of claim 1, wherein a diameter of the insulated wire ranges from 0.10 mm to 0.50 mm, and wherein the core comprises ferrite.

12. A transponder, comprising:
an antenna assembly, including:
a core;
an insulated wire coiled around the core, the insulated wire having a first end and a second end; and
an integrated circuit chip electrically coupled to the first end and the second end of the insulated wire;
a capsule enclosing the antenna assembly and defining a space between the capsule and the antenna assembly; and
a high temperature adhesive completely covering the insulated wire and filling the space between the capsule and the antenna assembly.

13. The transponder of claim 12, wherein the core has a length ranging from 5 mm to 20 mm and a width ranging from 0.5 mm to 5 mm.

14. The transponder of claim 12, wherein the high temperature adhesive comprises a glue or epoxy material configured to withstand temperatures ranging from 180° C. to 270° C. without evaporating or expanding.

15. The transponder of claim 12, wherein the transponder is configured for shock resistance, and the high temperature adhesive does not become brittle after heating and cooling.

16. The transponder of claim 12, wherein the high temperature adhesive is a light-curing acrylate adhesive.

17. A transponder comprising:
an antenna assembly including:
a core having a width ranging from 0.5 mm to 5 mm;
an insulated wire wound around the core, the wire having a first end and a second end; and
an integrated circuit chip comprising two portions of a metal or metal alloy embedded into a surface of the integrated circuit chip, wherein the first and second ends of the wire are each connected to one of the two portions; and
an adhesive covering at least 75% of the insulated antenna wire, wherein the adhesive withstands temperatures ranging from 180° C. to 270° C. without evaporating or expanding.

18. The transponder of claim 17, further comprising a capsule enclosing the antenna assembly and defining a space adjacent to the antenna assembly, and wherein the adhesive fills at least 75% of the space adjacent to the antenna assembly.

19. The transponder of claim 18, wherein the transponder is configured to withstand 4 to 8 hour cycles of temperatures between 165 and 195° C. (±15° C.).

20. The transponder of claim 17, wherein a length of the core runs perpendicular to the width and ranges from 5.0 mm to 20 mm.

* * * * *